(12) United States Patent
Cui et al.

(10) Patent No.: US 9,095,923 B2
(45) Date of Patent: Aug. 4, 2015

(54) METHOD OF WELDING ALLOY ARTICLES

(75) Inventors: Yan Cui, Greer, SC (US); Daniel Anthony Nowak, Spring, TX (US); Srikanth Chandrudu Kottilingam, Simpsonville, SC (US); Brian Lee Tollison, Honea Path, SC (US); Dechao Lin, Greer, SC (US)

(73) Assignee: General Electric Company, Schenectady, NY (US)

( * ) Notice: Subject to any disclaimer, the term of this patent is extended or adjusted under 35 U.S.C. 154(b) by 386 days.

(21) Appl. No.: 13/549,891

(22) Filed: Jul. 16, 2012

(65) Prior Publication Data

US 2014/0014628 A1 Jan. 16, 2014

(51) Int. Cl.
*B23K 9/23* (2006.01)
*B23K 26/32* (2014.01)
*C22C 1/02* (2006.01)

(52) U.S. Cl.
CPC .............. *B23K 9/23* (2013.01); *B23K 26/3213* (2013.01); *C22C 1/02* (2013.01)

(58) Field of Classification Search
CPC ............... B23K 9/23; B23K 26/3213; B23K 2201/001; B23K 2203/08; B23K 10/02; B23K 9/291; B23K 9/296; C21D 9/50; C21D 9/505
USPC .................................. 219/75, 121.46, 121.64
See application file for complete search history.

(56) References Cited

U.S. PATENT DOCUMENTS

| | | | |
|---|---|---|---|
| 3,506,251 A | | 4/1970 | Sampatacos |
| 4,409,462 A | * | 10/1983 | Jahnke ..................... 219/121.64 |
| 5,106,010 A | * | 4/1992 | Stueber et al. ................ 228/232 |
| 5,374,319 A | * | 12/1994 | Stueber et al. ................ 148/404 |
| 6,333,484 B1 | * | 12/2001 | Foster et al. ............. 219/121.64 |
| 2005/0028897 A1 | * | 2/2005 | Kurz et al. ..................... 148/525 |
| 2005/0194363 A1 | * | 9/2005 | Hu et al. .................. 219/121.64 |
| 2006/0231535 A1 | * | 10/2006 | Fuesting ................... 219/121.64 |

(Continued)

FOREIGN PATENT DOCUMENTS

| | | |
|---|---|---|
| EP | 0045986 A1 | 2/1982 |
| EP | 0478374 A2 | 4/1992 |

(Continued)

OTHER PUBLICATIONS

European Search Report and Written Opinion issued in connection with corresponding EP Application No. 13176282.5-1702 on Nov. 28, 2013.

*Primary Examiner* — Geoffrey S Evans

(74) *Attorney, Agent, or Firm* — Ernest G. Cusick; Gary M. Hartman; Domenica N. S. Hartman

(57) ABSTRACT

A method of welding alloys having a ductility drop temperature range to limit strain-age cracking. The method involves the use of a welding device to weld a weld area of an article while maintaining temperatures throughout the weld area and a heat affected zone adjacent the weld area within a non-crack sensitive temperature range that is above a ductility drop temperature range of the alloy being welded. During welding, the temperatures of the weld area and the heat affected zone are predominantly controlled with heat input from the welding device. Once the welding has been terminated, the weld area and the heat affected zone are cooled from the non-crack sensitive temperature range through the ductility drop temperature range to a temperature below the ductility drop temperature range of the alloy.

20 Claims, 7 Drawing Sheets

(56) References Cited

U.S. PATENT DOCUMENTS

| | | | |
|---|---|---|---|
| 2008/0029495 A1* | 2/2008 | Emiljanow et al. | 219/121.61 |
| 2008/0164301 A1* | 7/2008 | Nowak et al. | 228/226 |
| 2009/0026173 A1* | 1/2009 | Arnett et al. | 219/74 |
| 2010/0170878 A1* | 7/2010 | Krause | 219/74 |
| 2010/0279148 A1* | 11/2010 | Hu | 428/680 |
| 2011/0100964 A1* | 5/2011 | Burbaum et al. | 219/121.64 |
| 2012/0097645 A1* | 4/2012 | Clark et al. | 219/121.14 |
| 2012/0267347 A1* | 10/2012 | Arjakine et al. | 219/121.64 |
| 2013/0232749 A1* | 9/2013 | Bruck et al. | 29/402.01 |
| 2013/0292362 A1* | 11/2013 | Fairchild et al. | 219/74 |

FOREIGN PATENT DOCUMENTS

| | | |
|---|---|---|
| WO | 0187528 A2 | 11/2001 |
| WO | WO-2011/058045 A1 * | 5/2011 |

* cited by examiner

METHOD OF WELDING ALLOY ARTICLES

BACKGROUND OF THE INVENTION

The present invention generally relates to welding processes and materials. More particularly, this invention relates to a process for welding alloys that are prone to cracking when welded.

Components of gas turbine engines, such as blades (buckets), vanes (nozzles) and combustors, are typically formed of nickel, cobalt or iron-base superalloys with desirable mechanical properties for turbine operating temperatures and conditions. Notable examples are gamma prime precipitation-strengthened nickel-base superalloys, particular examples of which include René 125, René 80, René N5, René N4, René 108, GTD-111®, GTD-444®, IN738, IN792, MAR-M200, MAR-M247, CMSX-3, CMSX-4, PWA1480, PWA1483, and PWA1484. Each of these alloys has a relatively high gamma prime (principally $Ni_3(Al,Ti)$) content as a result of containing significant amounts of aluminum and/or titanium. As the material requirements for gas turbine components have increased with higher operating temperatures, various processing methods have been used to enhance the mechanical, physical and environmental properties of components formed from superalloys.

During the operation of a gas turbine engine, turbine components are subjected to various types of damage or deterioration, including wear and cracks. Because the cost of components formed from superalloys is relatively high, it is more desirable to repair these components than to replace them. For the same reason, new-make components that require repair due to manufacturing flaws are also preferably repaired instead of being scrapped. However, gamma prime precipitation-strengthened nickel-base superalloys have poor fusion weldability due to their liquidation cracking and, especially, strain-age cracking (SAC) tendencies.

Typical ductility characteristics of gamma prime precipitation-strengthened nickel-base superalloys are represented in FIG. 1 relative to temperature. Liquidation cracking occurs within a brittleness temperature range (BTR), usually between the solidus temperature ($T_s$) and the liquidus temperature ($T_l$) of the material, and strain-age cracking occurs in a ductility drop temperature range (DTR), usually between $T_s$ and about $0.5T_s$, identified in FIG. 1. Strain-age cracking is a significant problem that exists in many nickel-based alloys, and is manifested by the drop in ductility within the ductility drop temperature range of an alloy during cooling. As a result of this phenomenon, susceptible materials often exhibit cracking in the weld metal heat affected zones (HAZ), including the area of the fusion zone re-heated during multiple pass welding, which are exposed to the ductility drop temperature range during the weld thermal cycle. Although the problem is fairly common, the underlying mechanism of ductility drop is still not fully understood.

Various methods have been used to avoid the strain-age cracking problem. These methods include preheating the alloys prior to welding to limit thermal stresses, using a low heat input source for welding, slowly cooling after welding to limit thermal stresses within the alloy, and over aging the alloy thereby reducing its creep resistance and allowing stress relaxation to take place more readily. Interpass temperature control is a commonly used welding method that requires an operator to pause between weld passes with a welding device to allow the weld alloy/weldment temperature to drop to a desired temperature, typically less than 350° F. (177° C.), before the next weld pass. This welding method is used to prevent deterioration of the weld metal and heat affected zone properties, especially when notch toughness is an important factor. However, due to poor inherent weldability of certain superalloys, such as precipitation-strengthened nickel-base superalloys, such welding techniques may have a limited affect in controlling the size and quantity of cracks.

U.S. Pat. No. 6,333,484 discloses a process for welding a nickel or cobalt based superalloy article to minimize cracking by preheating the entire weld area to a maximum ductility temperature range, maintaining such temperature during welding and solidification of the weld, raising the temperature for stress relief of the superalloy, and then cooling at a rate effective to minimize gamma prime precipitation. A disadvantage of this process is its reliance on an external induction heating coil as a heating source. Further, the temperature of the weld area must be controlled throughout the process. In view of this, improved methods are desirable for welding precipitation-strengthened superalloys, and particularly gamma prime precipitation-strengthened nickel-base alloys, by which strain-age cracking can be reduced or avoided in weldments.

BRIEF DESCRIPTION OF THE INVENTION

The present invention provides a method of welding alloys that is capable of limiting strain-age cracking in weldments.

According to a first aspect of the invention, a method of welding an article formed of an alloy having a ductility drop temperature range includes the use of a welding device to weld a weld area of the article while maintaining temperatures throughout the weld area and a heat affected zone adjacent the weld area within a non-crack sensitive temperature range that is above a ductility drop temperature range of the alloy by predominantly controlling temperatures of the weld area and the heat affected zone with heat input from the welding device. Once the welding is terminated, the weld area and the heat affected zone are cooled from the non-crack sensitive temperature range through the ductility drop temperature range to a temperature below the ductility drop temperature range of the alloy.

According to a second aspect of the invention, a method of welding a component of a gas turbine engine component formed of a precipitation-strengthened nickel-base superalloy having a ductility drop temperature range includes continuously welding a weld area of the component using a welding device and a fusion welding process. During welding, temperatures throughout the weld area and a heat affected zone adjacent the weld area are maintained within a non-crack sensitive temperature range that is above a ductility drop temperature range of the superalloy by predominantly controlling temperatures of the weld area and the heat affected zone with heat input from the welding device. Once the welding is terminated, the weld area and the heat affected zone are cooled from the non-crack sensitive temperature range through the ductility drop temperature range to a temperature below the ductility drop temperature range of the component.

According to a third aspect of the invention, a method of welding an article formed of an alloy having a ductility drop temperature range includes the use of a welding device to weld a first portion of a weld area of the article while maintaining the temperatures throughout the first portion of the weld area and a heat affected zone adjacent the first portion of the weld area within a non-crack sensitive temperature range that is above the ductility drop temperature range of the alloy by predominantly controlling temperatures of the first portion of the weld area and the heat affected zone with heat input from the welding device. Once the welding of the first portion is terminated, the first portion of the weld area and the heat affected zone are cooled from the non-crack sensitive temperature range through the ductility drop temperature range to a temperature below the ductility drop temperature range of the alloy. The welding device is then used to weld at least a second portion of the weld area of the article while maintaining the temperatures throughout the second portion of the weld area and a heat affected zone adjacent the second portion of the weld area within the non-crack sensitive temperature range that is above the ductility drop temperature range of the alloy by predominantly controlling temperatures of the second portion of the weld area and the heat affected zone with heat input from the welding device. Once the welding of the second portion is terminated, the second portion of the weld area and the heat affected zone are cooled from the non-crack sensitive temperature range through the ductility drop temperature range to a temperature below the ductility drop temperature range of the alloy.

A technical effect of the invention is the ability to weld various alloys, including precipitation-strengthened superalloys, while avoiding or limiting strain-age cracking and without the requirement for any supplemental heat sources.

Other aspects and advantages of this invention will be better appreciated from the following detailed description.

DETAILED DESCRIPTION OF THE INVENTION

The invention will be described in reference to a gamma prime-strengthened (principally $Ni_3(Al,Ti)$) nickel-based superalloy (hereinafter, gamma-prime nickel superalloy), as is often the case for nozzles (vanes), buckets (blades), and other components located within the combustors and turbine sections of industrial and aircraft gas turbines. Particularly notable examples of gamma-prime nickel superalloys include René 125, René 80, René N5, René N4, René 108, GTD-111®, GTD-444®, IN738, IN792, MAR-M200, MAR-M247, CMSX-3, CMSX-4, PWA1480, PWA1483, and PWA1484, each of which has a relatively high gamma prime content as a result of the significant amounts of aluminum and/or titanium they contain. However, it is foreseeable that the advantages of this invention could be obtained with components formed by other methods from a variety of materials that are prone to cracking during welding. A method in accordance with the present invention is especially suitable for alloys which do not undergo a phase transformation in their matrix during solidification and experience a ductility drop over a certain range of temperatures. Such suitable alloys include, but are not limited to, nickel-base superalloys, cobalt-base superalloys, some stainless steels (such as austenitic SS) and aluminum alloys.

A method of welding in accordance with the present invention described hereinafter is especially suitable for fusion welding processes, and in which the molten weld pool that forms during the welding operation is maintained in or shielded by an atmosphere provided by an inert or other nonreactive gas, for example, argon or helium. Such fusion welding processes include, but are not limited to, gas tungsten arc welding (GTAW) techniques (also known as tungsten inert gas (TIG) welding) and plasma transferred arc (PTA) welding processes, and laser welding, which can be performed at room and elevated temperatures. A weld filler material may also be used, for example, a ductile filler material or a filler material whose chemistry closely matches that of the base metal being welded.

Figure 1:
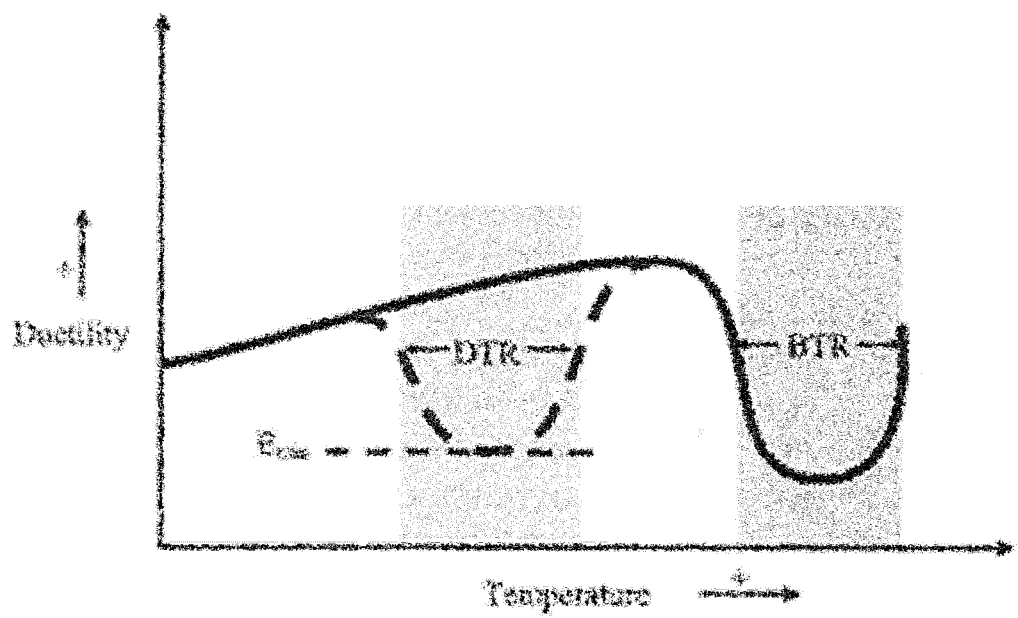
FIG. 1 is a graph representing ductility of a gamma prime precipitation-strengthened nickel-base superalloy relative to temperature.

Traditional methods of welding nickel-based superalloys, such as those that involve interpass temperature control, intentionally subject the weldment through a temperature cycle that includes the ductility drop temperature range. Based on investigations leading to the present invention, it was concluded that such cyclic heating and cooling can increase the number of cracks and crack lengths associated with strain-age cracking. In a preferred aspect of the present invention, strain-age cracking can be minimized or avoided by limiting the amount of time that the temperature of a weldment formed in an article is within the ductility drop temperature range of the alloy being welded. This may be accomplished by continuous welding, which as used herein is defined as welding techniques that maintain a weldment at a sufficiently high temperature until the completion of the welding operation by performing weld passes without intermediate pauses to avoid cyclic heating and cooling associated with interpass temperature control techniques. More preferably, during a continuous welding technique of the present invention, the temperature of the weldment remains within a non-crack sensitive temperature range of the particular alloy being welded. As used herein, the non-crack sensitive temperature range is a temperature range above the ductility drop temperature range (DTR) of a particular alloy where strain-age cracking tends to occur in the alloy, and below a brittleness temperature range (BTR) of the alloy where liquidation cracking tends to occur in the alloy. The non-crack sensitive temperature range can be visually understood to exist between the DTR and BTR zones represented in FIG. 1. In particular, the non-crack sensitive temperature range can be seen in FIG. 1 to fully encompass a peak in the ductility of an alloy that occurs below the brittleness temperature range.

According to a preferred aspect of the invention, maintaining the temperatures of the weldment and adjacent heat affected zones (HAZ) within the non-crack sensitive temperature range during welding, for example, preferably between the $T_s$ and $0.5T_s$ of the material, serves to limit the quantity and length of cracks in the heat affected zones that would otherwise form as a result of strain-age cracking. The exact temperature range necessary to achieve these conditions will depend on the alloy being welded since each alloy has a different inherent sensitive temperature ranges, DTR and BTR. If the temperature of the weldment is predominately controlled by the heat input of the welding device, a situation may arise wherein the weld is so long that temperatures within portions of the weldment drop into the DTR zone between weld passes. In such a situation, continuous welding may be performed on only a portion of the weld prior to quenching. Once the welded portion has been quenched, the process may be repeated on a subsequent portion of the weld. By welding long welds in short intervals, the temperature of the heat affected regions of the weldment will likely remain within the non-crack sensitive temperature range as desired. In some cases, it may be desirable to preheat at least the region to be welded prior to initiating the welding operation, in which case the region may be preheated to a temperature above the ductility drop temperature range and preferably within the non-crack sensitive temperature range of the alloy.

Once a welding process as described above has been completed, the article is preferably quenched to room temperature. Quenching is performed so that the temperature of the weldment quickly passes through the ductility drop temperature range, which is believed to limit the time that would be otherwise necessary for crack formation and growth to occur. Quenching may be performed by any means and with any medium capable of quickly lowering the temperature of the weld and heat affected zones. For example, the article may be quenched by forcing compressed air over the weldment. Other quenching mediums may include nitrogen, $CO_2$, or an inert gas such as argon or helium. To ensure that the weldment does not remain within the DTR long enough for crack initiation and growth to occur, the weld and heat affected zones may need to be cooled at a minimum temperature drop rate of at least 50° F. per second (10° C. per second), with a preferred rate of about 100° F. per second (40° C. per second) or more.

Figure 2:
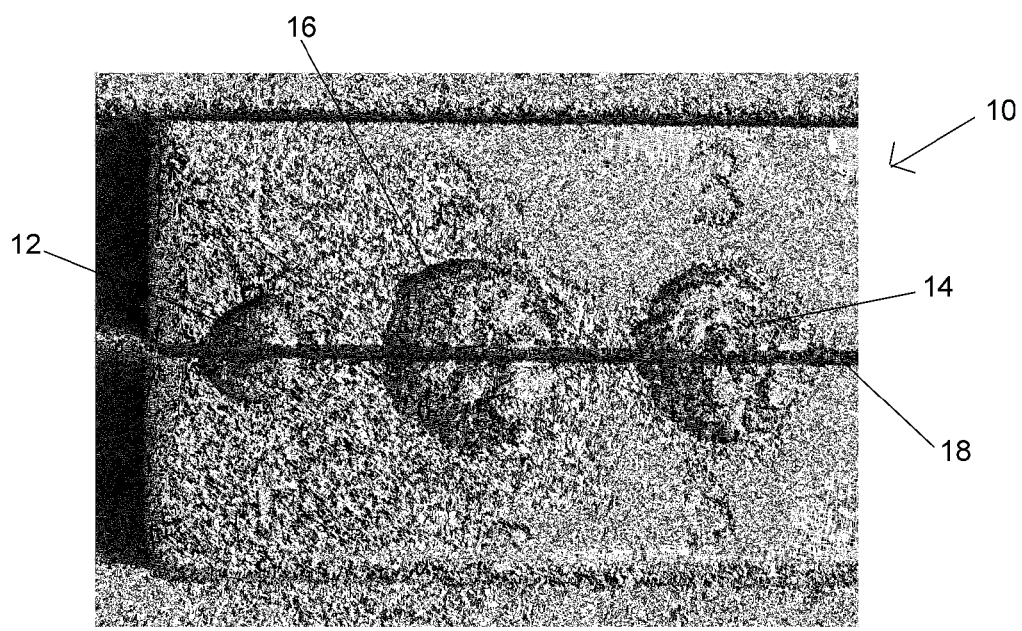
FIG. 2 is a scanned image showing a coupon formed of a gamma prime precipitation-strengthened nickel-base superalloy and in which three welds were formed during a first welding trial performed in accordance with one embodiment of the present invention.
Figure 3:
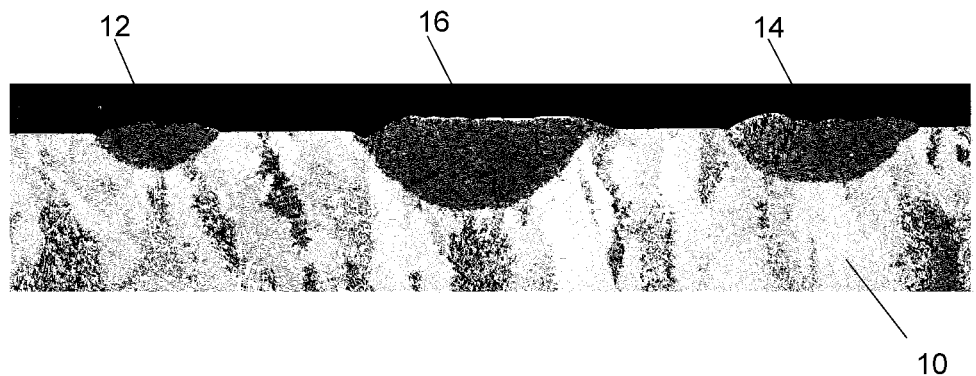
FIG. 3 is a micrograph showing a cross-sectional view of the three welds of the weld coupon of FIG. 2.
Figure 4:
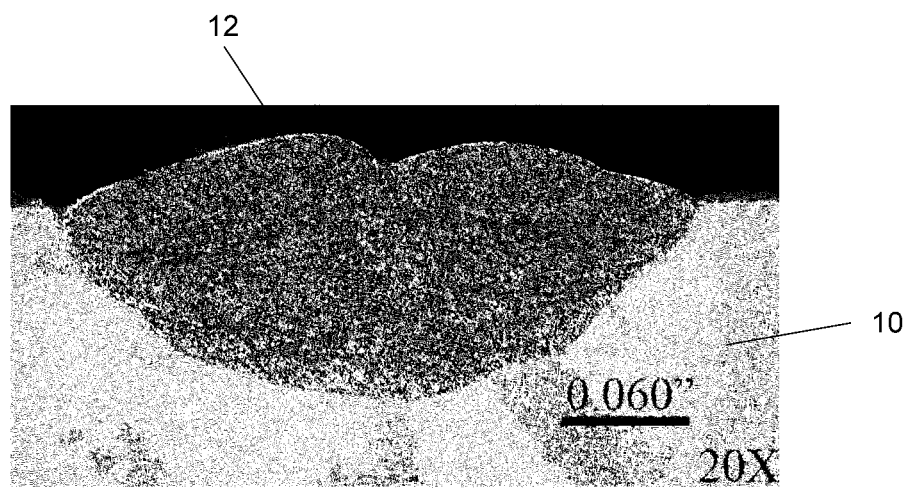
FIGS. 4 through 6 are micrographs showing cross-sectional views of the three welds of FIG. 3 under greater magnification.
Figure 5:
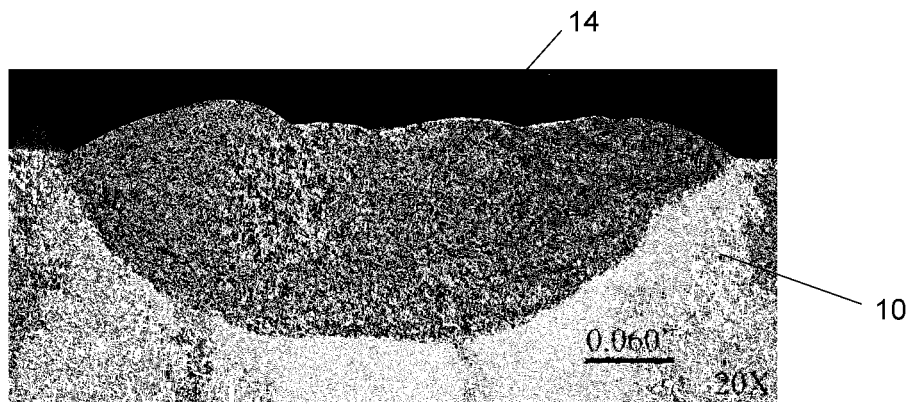
Figure 6:
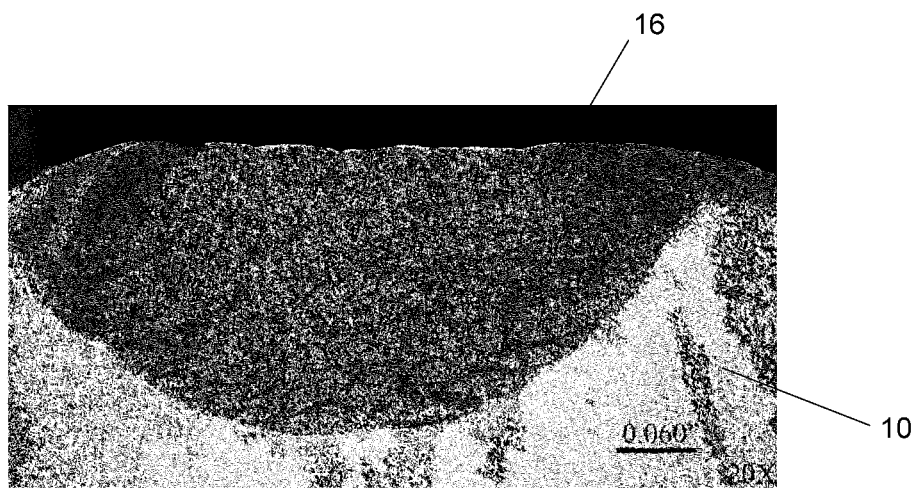

In an investigation leading up to the present invention, a series of trials was performed to test the above described method of welding, i.e. continuous welding followed by quenching with compressed air. In a first trial of the series, a R108 cast weld coupon 10 was welded in three locations as represented in FIG. 2. Continuous welding was performed with a weld current of about 35 A to about 55 A. A weld filler metal was used to fill hemispherical cavities, yielding weldments 12, 14 and 16 having diameters of 0.25 inch, 0.38 inch and 0.50 inch (about 6, 9.5 and 13 millimeters), respectively. Immediately following welding, the weldments were quenched to room temperature with compressed air at a cooling rate of more than about 25° C. per second. A cut 18 was made through the weld coupon 10 in order to analyze the weldments 12, 14 and 16. FIG. 3 shows a cross-sectional micrograph of the weldments 12, 14 and 16. Upon analysis, the weldments 12, 14 and 16 were determined to have resulted in a significantly reduced amount of cracks at the fusion boundary at the interface between the weld metal and the heat affected zone as represented in FIGS. 4-6.

Figure 7:
FIG. 7 is a scanned image showing welds in a nozzle formed of a gamma prime precipitation-strengthened nickel-base superalloy during a second welding trial.
Figure 8:
FIGS. 8 through 10 are micrographs showing cross-sectional views of the welds from FIG. 7.
Figure 9:
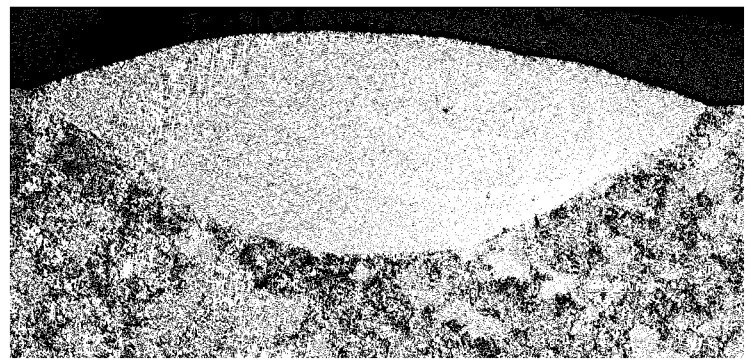
Figure 10:
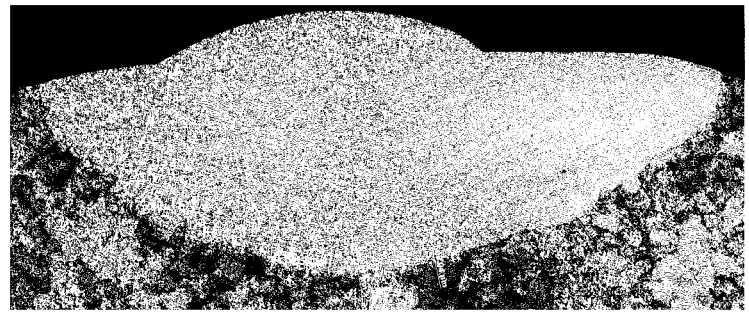

In a second trial of the series, a R108 cast nozzle 20 was welded in a solutioned condition. Welding and quenching parameters were similar to those used in the first trial above. The weld filler metal was used to fill cavities, resulting in weldments of about 0.25 inch to 0.38 inch (about 6 to 9.5 millimeter) wide and about 0.060 inch to 0.125 inch (about 1.5 to 3 millimeter) deep, as represented in FIG. 7. FIGS. 8-10 show cross-sectional micrographs representative of the resulting weldments. Again, the resulting weldments were determined to have resulted in a significantly reduced amount of cracks at the fusion boundary at the interface between the weld metal and the heat affected zone compared to the prior art.

Figure 11:
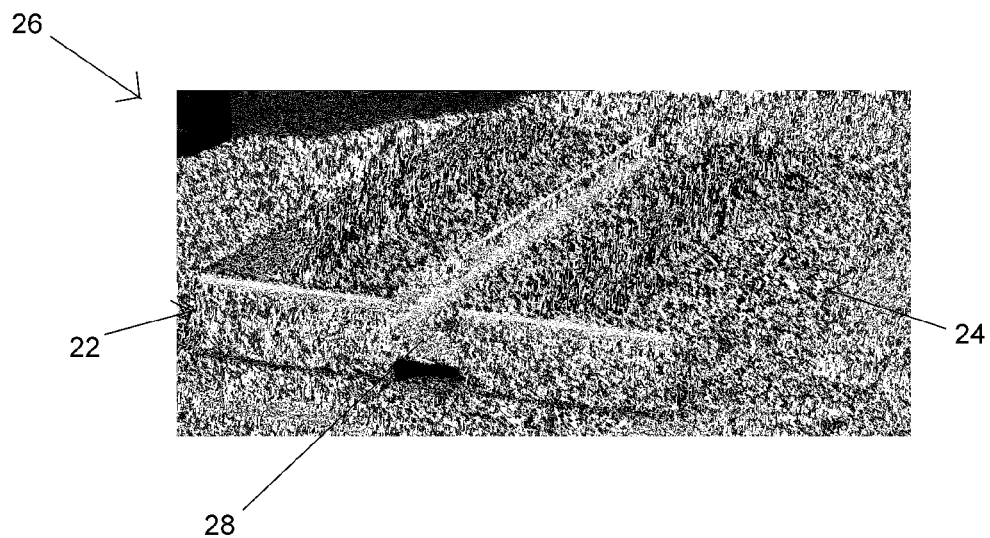
FIG. 11 is a scanned image representing a coupon formed of a gamma prime precipitation-strengthened nickel-base superalloy and butt welded during a third welding trial performed in accordance with one embodiment of the present invention.
Figure 12:
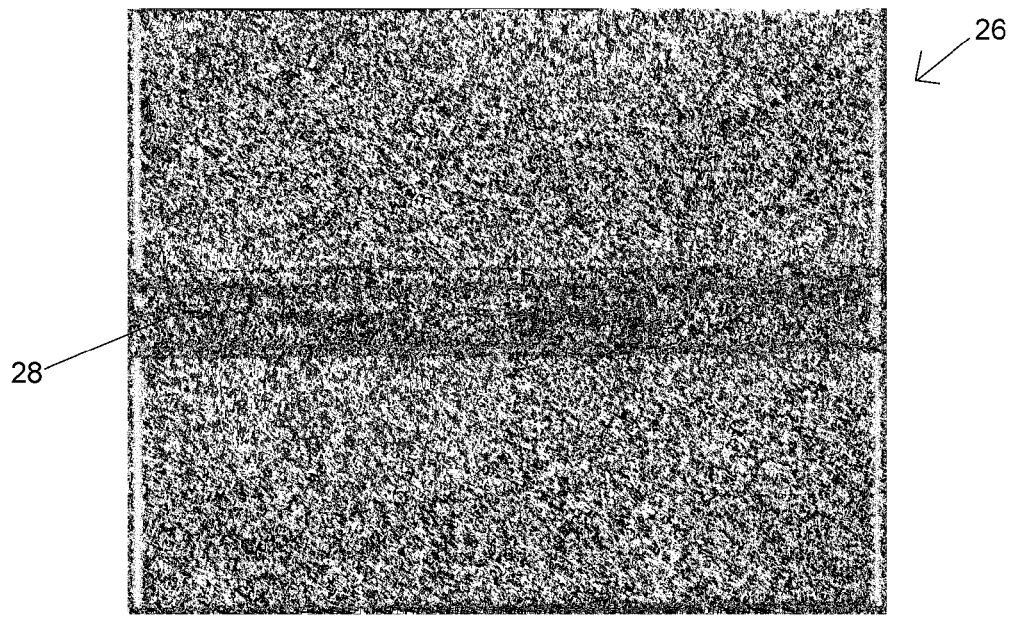
FIG. 12 is a scanned image showing a top view of the weld butt joint coupon of FIG. 11.
Figure 13:
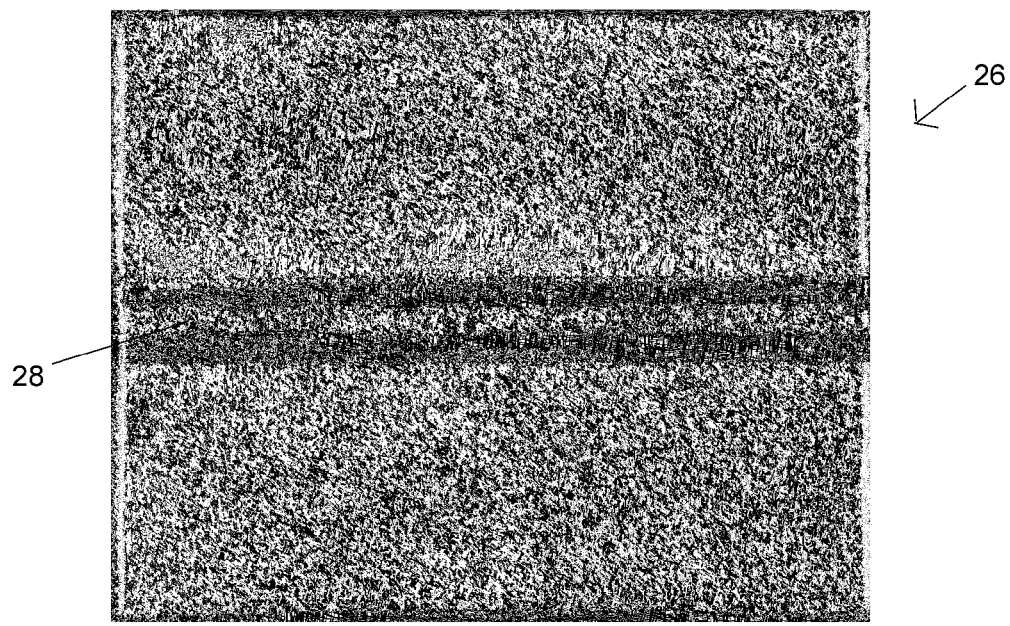
FIG. 13 is a scanned image showing a bottom view of the weld butt joint coupon of FIG. 11.
Figure 14:
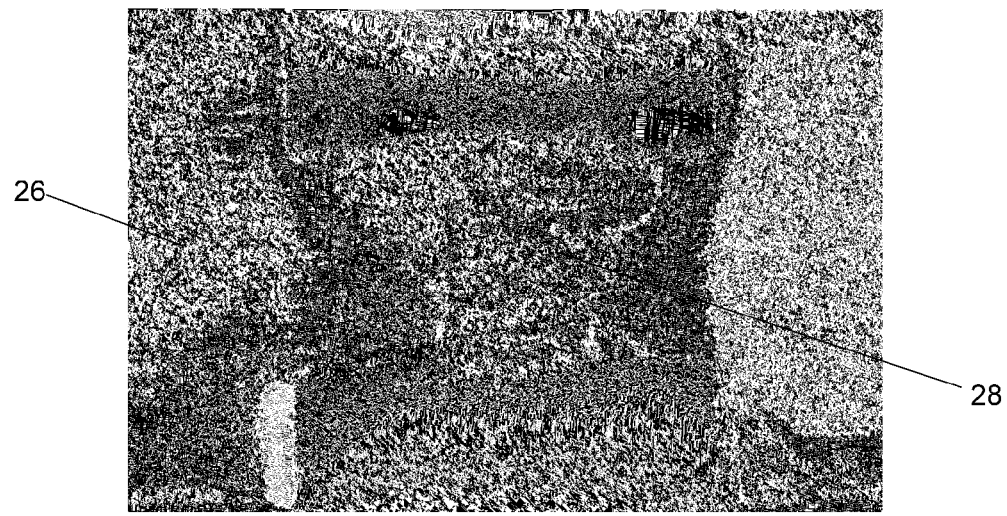
FIG. 14 is a micrograph showing a side view of the weld butt joint coupon of FIG. 11.
Figure 15:
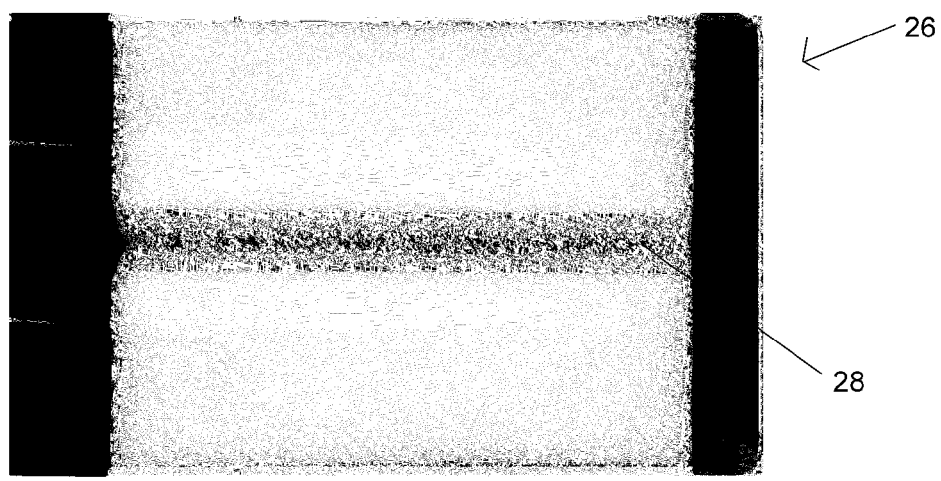
FIG. 15 is an x-ray showing a top view of the weld butt joint coupon of FIG. 11.

In a third trial, a first R108 coupon 22 and a second R108 coupon 24, both in over age condition, were welded together yielding the butt joint coupon 26 shown in FIG. 11. First, the coupons 22 and 24 were clad with the weld filler metal. After welding one third length of each bead, the weldment was quenched with compressed air. The weldment was next butt joint welded again over one third length of the weld with a weld current of about 35 A to about 55 A. This was followed by another quenching to room temperature with compressed air at a rate of more than about 25° C. per second. Welding of the butt joint coupon 26 was followed by a heat treatment at 2050° F. (about 1120° C.) for about two hours. A resulting weldment 28 is shown from above in FIG. 12 and below in FIG. 13. FIG. 14 represents a cross-sectional view of the weldment 28. The weldment 28 was analyzed for cracks by non-destructive testing. Tests performed included fluorescent penetrant inspection (FPI) and x-ray (radiographic) testing. An x-ray of the butt joint coupon 26 is shown in FIG. 15. The resulting weldment 28 resulted in a significantly reduced amount of cracks compared to the prior art.

From the three trials discussed above it was concluded that continuous welding followed by quenching, in accordance with a preferred aspect of the present invention, is an effective method of welding R108 that minimizes cracking in superalloys with poor weldability. In all three trials, the articles were welded by continuous welding and the temperature of the weldments and surrounding heat affected zones was predominately controlled by the heat input of the welding device. During the welding operations, the temperatures of the weldments and heat affected zones were maintained within the non-crack sensitive temperature range for R108, which is believed to be a temperature range of about 760° C. to about 870° C., thereby reducing strain-age cracking that would be otherwise caused by the heating and cooling cycles imposed by traditional welding techniques. Welding was followed by quenching the weldments and surrounding heat affected zones with compressed air, thereby forcing the temperature of the weldment to quickly pass through the DTR to further reduce the incidence of strain-age cracking. Since R108 is an especially difficult superalloy to weld without cracking, this method is expected to be effective on other gamma prime precipitation-strengthened nickel-base superalloys, as well as other alloys that tend to be susceptible to strain-age cracking, particularly alloys that do not undergo a phase transformation in their matrix during solidification and experience a ductility drop over a certain range of temperatures, nonlimiting examples of which include cobalt-base superalloys, some stainless steels (such as austenitic SS), and aluminum alloys. Notably, the method was further shown to successfully limit cracking in precipitation-strengthened alloys in solutioned and over-aged conditions. As such, continuous welding followed by quenching was concluded to be a viable method for welding a variety of alloys that are susceptible to strain-age cracking.

While the invention has been described in terms of certain embodiments, it is apparent that other forms could be adopted by one skilled in the art. Therefore, the scope of the invention is to be limited only by the following claims.

The invention claimed is:
1. A method of welding an article formed of an alloy having a ductility drop temperature range, the method comprising:

welding a weld area of the article with heat input from a welding device;

during the welding step, maintaining the temperatures throughout the weld area and a heat affected zone adjacent the weld area within a non-crack sensitive temperature range that is above the ductility drop temperature range of the alloy by predominantly controlling temperatures of the weld area and the heat affected zone with the heat input from the welding device;

terminating the welding step; and then cooling the weld area and the heat affected zone from the non-crack sensitive temperature range through the ductility drop temperature range to a temperature below the ductility drop temperature range of the alloy immediately after terminating the welding step.

2. The method according to claim 1, further comprising the step of maintaining an inert atmosphere around the weld area during the welding step.

3. The method according to claim 1, wherein the welding step is performed at room temperature.

4. The method according to claim 1, wherein the article is welded by continuous welding including performing more than one weld pass without intermediate pauses that allow the temperatures throughout the weld area and the heat affected zone adjacent the weld area to drop below the non-crack sensitive temperature range.

5. The method according to claim 1, wherein the fusion welding process is chosen from the group consisting of gas tungsten arc welding and plasma transferred arc welding techniques, and the temperatures of the weld area and the heat affected zone are controlled solely by an electric arc of the welding device without the requirement for any supplemental heat sources.

6. The method according to claim 1, wherein the welding process is chosen from the group consisting of gas tungsten arc welding, plasma transferred arc welding and laser welding techniques.

7. The method according to claim 1, cooling the article at a rate of at least 40° C. per second.

8. The method according to claim 1, wherein the non-crack sensitive temperature range of the alloy is within about Ts to about 0.5 Ts of the alloy.

9. The method according to claim 1, wherein the alloy is a precipitation-strengthened nickel-base superalloy.

10. The method according to claim 1, wherein the alloy is selected from the group consisting of nickel-base superalloys, cobalt-base superalloys, stainless steels and aluminum alloys.

11. The method according to claim 1, wherein the article is a component of a gas turbine engine.

12. A method of welding a gas turbine engine component formed of a precipitation-strengthened nickel-base superalloy having a ductility drop temperature range, the method comprising:

welding a weld area of the component by continuous welding including more than one weld pass using heat input from a welding device and a fusion welding process;

during the welding step, maintaining the temperatures throughout the weld area and a heat affected zone adjacent the weld area within a non-crack sensitive temperature range that is above the ductility drop temperature range of the superalloy by predominantly controlling temperatures of the weld area and the heat affected zone with the heat input from the welding device, wherein intermediate pauses between the weld passes are not of a time sufficient to allow the temperatures throughout the weld area and a heat affected zone adjacent the weld area to drop below the non-crack sensitive temperature range;

terminating the welding step; and then cooling the weld area and the heat affected zone from the non-crack sensitive temperature range through the ductility drop temperature range to a temperature below the ductility drop temperature range of the component;

wherein the welding step is performed at room temperature.

13. The method according to claim 12, further comprising the step of maintaining an inert atmosphere around the weld area during welding.

14. The method according to claim 12, wherein the fusion welding process is chosen from the group consisting of gas tungsten arc welding and plasma transferred arc welding techniques.

15. The method according to claim 12, wherein the component is cooled at a rate of at least 40° C. per second.

16. The method according to claim 12, wherein the non-crack sensitive temperature range is within about Ts to about 0.5 Ts of the superalloy.

17. The method according to claim 12, wherein the superalloy is a gamma prime precipitation-strengthened nickel-base superalloy.

18. The method according to claim 12, wherein the fusion welding process is chosen from the group consisting of gas tungsten arc welding and plasma transferred arc welding techniques.

19. The method according to claim 18, wherein the temperatures of the weld area and the heat affected zone are controlled solely by an electric arc of the welding device without the requirement for any supplemental heat sources.

20. A method of welding an article formed of an alloy having a ductility drop temperature range, the method comprising:

welding a weld area of the article by continuous welding including more than one weld pass with an electric arc from a welding device at room temperature;

during the welding of the weld area, maintaining the temperatures throughout the weld area and a heat affected zone adjacent to the weld area within a non-crack sensitive temperature range that is above the ductility drop temperature range of the alloy by predominantly controlling temperatures of the weld area and the heat affected zone adjacent thereto with the electric arc from the welding device, wherein intermediate pauses between the weld passes are not of a time sufficient to allow the temperatures throughout the weld area and a heat affected zone adjacent the weld area to drop below the non-crack sensitive temperature range;

terminating the welding of the first portion;

cooling the first portion of the weld area and the heat affected zone adjacent thereto from the non-crack sensitive temperature range through the ductility drop temperature range to a temperature below the ductility drop temperature range of the alloy immediately after terminating the welding step.

* * * * *